United States Patent
Boshev et al.

(10) Patent No.: US 10,198,330 B2
(45) Date of Patent: Feb. 5, 2019

(54) CONFIGURING DISASTER RECOVERY FOR A CLOUD BASED APPLICATION

(71) Applicant: SAP SE, Walldorf (DE)

(72) Inventors: Stoyan Boshev, Sofia (BG); Mincho Velev, Stara Zagora (BG)

(73) Assignee: SAP SE, Walldorf (DE)

( * ) Notice: Subject to any disclaimer, the term of this patent is extended or adjusted under 35 U.S.C. 154(b) by 143 days.

(21) Appl. No.: 15/365,816

(22) Filed: Nov. 30, 2016

(65) Prior Publication Data
US 2018/0150356 A1    May 31, 2018

(51) Int. Cl.
*G06F 11/20*    (2006.01)
*G06F 17/30*    (2006.01)
*H04L 29/12*    (2006.01)

(52) U.S. Cl.
CPC ...... *G06F 11/203* (2013.01); *G06F 17/30887* (2013.01); *H04L 61/1511* (2013.01)

(58) Field of Classification Search
CPC ............................ G06F 11/203; G06F 11/2033
See application file for complete search history.

(56) References Cited

U.S. PATENT DOCUMENTS

| 7,770,058 B2* | 8/2010 | Phan ............... G06F 11/2025 714/6.12 |
| 8,984,326 B2* | 3/2015 | Phan ............... G06F 11/2028 714/2 |
| 9,274,903 B1* | 3/2016 | Garlapati ......... G06F 11/2002 |
| 9,639,439 B2* | 5/2017 | Laicher ............. G06F 11/203 |
| 2015/0052218 A1* | 2/2015 | Zhang ................ H04L 67/10 709/217 |

* cited by examiner

*Primary Examiner* — Joseph R Kudirka
(74) *Attorney, Agent, or Firm* — Mintz Levin Cohn Ferris Glovsky and Popeo, P.C.

(57) ABSTRACT

In one respect, there is provided a method. The method can include: determining that a second instance of the cloud-based application is deployed at a second cloud platform landscape; replicating, at a second database at the second cloud platform landscape, at least a portion of data from a first database at the first cloud platform landscape, the data from the first database being associated with the first instance of the cloud-based application; and configuring a domain name system (DNS) service to include a primary universal resource locator (URL) for the first instance of the cloud-based application and a secondary URL for the second instance of the cloud-based application, the primary URL and the secondary URL both being associated with a custom domain of the cloud-based application. Related systems and articles of manufacture are also disclosed.

20 Claims, 5 Drawing Sheets

| | |
|---|---|
| *Language: | English (user profile language) ⌄ |
| *Priority: | Medium ⌄ |
| *Subject: | Premium Disaster Recovery Enablement |
| *Description: | Dear SAP Team,<br><br>We would like to request the enablement of the SAP HANA Cloud Platform premium disaster recovery service for the following:<br>- <accounts><br>- <applications><br>- <database aliases><br><br>Best regards,<br><s-user name> |
| *Installation: | 0090230460 - HANA CLOUD |
| *System: | (PROD) |
| *Component: | BC-NEO-DR |

CONFIGURING DISASTER RECOVERY FOR A CLOUD BASED APPLICATION

FIELD

The present disclosure generally relates to cloud computing and, more specifically, to disaster recovery for a cloud based application.

BACKGROUND

Many businesses rely on applications hosted on a cloud platform (e.g., SAP HANA Cloud Platform, as provided by SAP SE, Walldorf, Germany) configured to provide remote resources (e.g., servers and/or databases) for storing, managing, and/or processing data. But a cloud platform can fail due to natural and/or manmade disasters, thereby causing costly data loss and service interruptions.

SUMMARY

Methods, systems, and articles of manufacture, including computer program products, are provided for disaster recovery. In some implementations of the current subject matter, there is provided a system for enabling disaster recovery for a first instance of a cloud-based application deployed at a first cloud platform landscape. The system can include at least one processor and at least one memory. The at least one memory can include program code that provides operations when executed by the at least one processor. The operations can include: determining that a second instance of the cloud-based application is deployed at a second cloud platform landscape; replicating, at a second database at the second cloud platform landscape, at least a portion of data from a first database at the first cloud platform landscape, the data from the first database being associated with the first instance of the cloud-based application; and configuring a domain name system (DNS) service to include a custom domain of the cloud-based application, a primary universal resource locator (URL) for the first instance of the cloud-based application, and a secondary URL for the second instance of the cloud-based application, the custom domain of the cloud-based application being mapped by the DNS service to the secondary URL instead of to the primary URL in the event of a failure at the first cloud platform landscape.

In some variations, one or more of the features disclosed herein including the following features can optionally be included in any feasible combination. The deploying of the second instance of the cloud-based application and the replicating of the data from the first database at the second database can generate a fully operational copy of the cloud-based application at the second cloud platform landscape.

In some variations, one or more tests can be performed to determine a compliance of the enabled disaster recovery with respect to a recovery point objective (RPO) and/or a recovery time objective (RTO). The performing of the one or more tests can include: simulating a failure at the first cloud platform landscape; and performing a traffic switch by at least configuring the DNS service to map the custom domain of the cloud-based application to the secondary URL of the second instance of the cloud-based application instead of to the primary URL of the first instance of the cloud-based application, the mapping of the custom domain of the cloud-based application to the secondary URL causing requests for the custom domain of the cloud-based application to be routed to the second instance of the cloud-based application instead of to the first instance of the cloud-based application. The traffic switch can be a partial traffic switch during which requests for the custom-domain of the cloud-based application originating from one or more specific internet protocol (IP) addresses are routed to the second instance of the cloud-based application instead of to the first instance of the cloud-based application. Alternately and/or additionally, the traffic switch can be a full traffic switch during which all requests to the custom domain of the cloud-based application are routed to the second instance of the cloud-based application instead of to the first instance of the cloud-based application.

In some variations, one or more configurations applied to the second instance of the cloud-based application can be the same as at least some of a plurality of configurations applied at the first instance of the cloud-based application. The one or more configurations can include the custom domain for the cloud-based application, permissions, subscriptions, and/or destinations.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Like labels are used to refer to same or similar items in the drawings.

DETAILED DESCRIPTION

Disaster recovery measures can be implemented to minimize data loss and downtime in the event a cloud platform hosting a cloud-based application fails due to natural and/or manmade disasters. However, enabling disaster recovery measures for a cloud-based application can be a time consuming and convoluted procedure that requires frequent manual intervention. Thus, in some implementations of the current subject matter, a disaster recovery engine can be configured to automate the enablement of disaster recovery measures for a cloud-based application.

According to some implementations of the current subject matter, the enabling of disaster recovery measures for a cloud-based application hosted in a cloud platform landscape can include generating and deploying a fully operational copy of the cloud-based application at another cloud platform landscape. For instance, a primary instance of a cloud-based application can be replicated to generate a secondary instance of the same cloud-based application. The primary instance of the cloud-based application can be deployed in a primary cloud platform landscape while the secondary instance of the cloud-based application can be deployed in a secondary cloud platform landscape. In some implementations of the current subject matter, generating a fully operational copy of a cloud-based application can include replicating data associated with the cloud-based application at another cloud platform landscape. For example, data associated with the primary instance of the cloud-based application may be stored in a primary database at the primary cloud platform landscape. This data may be replicated at a secondary database at the secondary cloud platform landscape such that the secondary instance of the cloud-based application is a fully operational copy of the primary instance of the cloud-based application.

According to some implementations of the current subject matter, the same or similar configurations (e.g., custom domain, destinations) can be applied to both a primary instance of the cloud-based application and a secondary instance of the cloud-based application. In the event of a failure at the primary cloud platform landscape (e.g., as a result of a natural and/or manmade disaster), the secondary instance of the cloud-based application can replace the primary instance of the cloud-based application. That is, the secondary instance of the cloud-based application is able to provide the same functionalities as the primary instance of the cloud-based application, when the primary instance of the cloud-based application is unavailable.

In some implementations of the current subject matter, a DNS service can be configured to provide mappings between IP addresses and the corresponding domain name. For example, the DNS service can maintain a mapping between the custom domain of a cloud-based application and a corresponding URL. The enabling disaster recovery measures for a cloud-based application can include configuring the DNS service such that traffic can be redirected to a secondary cloud platform landscape in the event of a failure at a primary cloud platform landscape. For example, the DNS service can be configured to include a custom domain for the cloud-based application, a primary URL for a primary instance of the cloud-based application at the primary cloud platform landscape, and a secondary URL for a secondary instance of the cloud-based application at the secondary cloud platform landscape. While the primary cloud platform landscape is operational, the DNS service can be configured to map the custom domain of the cloud-based application to the primary URL associated with the primary instance of the cloud-based application, thereby causing requests to the cloud-based application to be routed to the primary instance of the cloud-based application at the primary cloud platform landscape. However, when the primary instance of the cloud-based application is unavailable, the DNS service can be configured to map the custom domain of the cloud-based application to the secondary URL associated with the secondary instance of the cloud-based application instead of the primary URL associated with the primary instance of the cloud-based application, thereby causing requests to the cloud-based application to be redirected to the second instance of the cloud-based application at the secondary cloud platform landscape.

In some implementations of the current subject matter, the enabling of disaster recovery measures for a cloud-based application can further include testing the disaster recovery measures. For example, testing the disaster recovery measures can include testing that a secondary copy of the cloud-based application at a secondary cloud platform landscape is fully replicated and operational. Alternately and/or additionally, testing the disaster recovery measures can further include simulating a failure at a primary cloud platform landscape that requires a partial and/or full switch of the traffic from the primary cloud platform landscape hosting a primary instance of the cloud-based application to a secondary cloud platform landscape hosting a secondary instance of the cloud-based application. A partial and/or full traffic switch can be performed to determine compliance with respect to one or more metrics including, for example, RPO and RTO. According to some implementations of the current subject matter, RPO may provide a measure of an amount of time during which data may be lost due to a failure at the primary cloud platform landscape. Meanwhile, RTO may provide a measure of an amount of time required to transition from the failed primary cloud platform landscape to the secondary cloud platform landscape.

Figure 1:
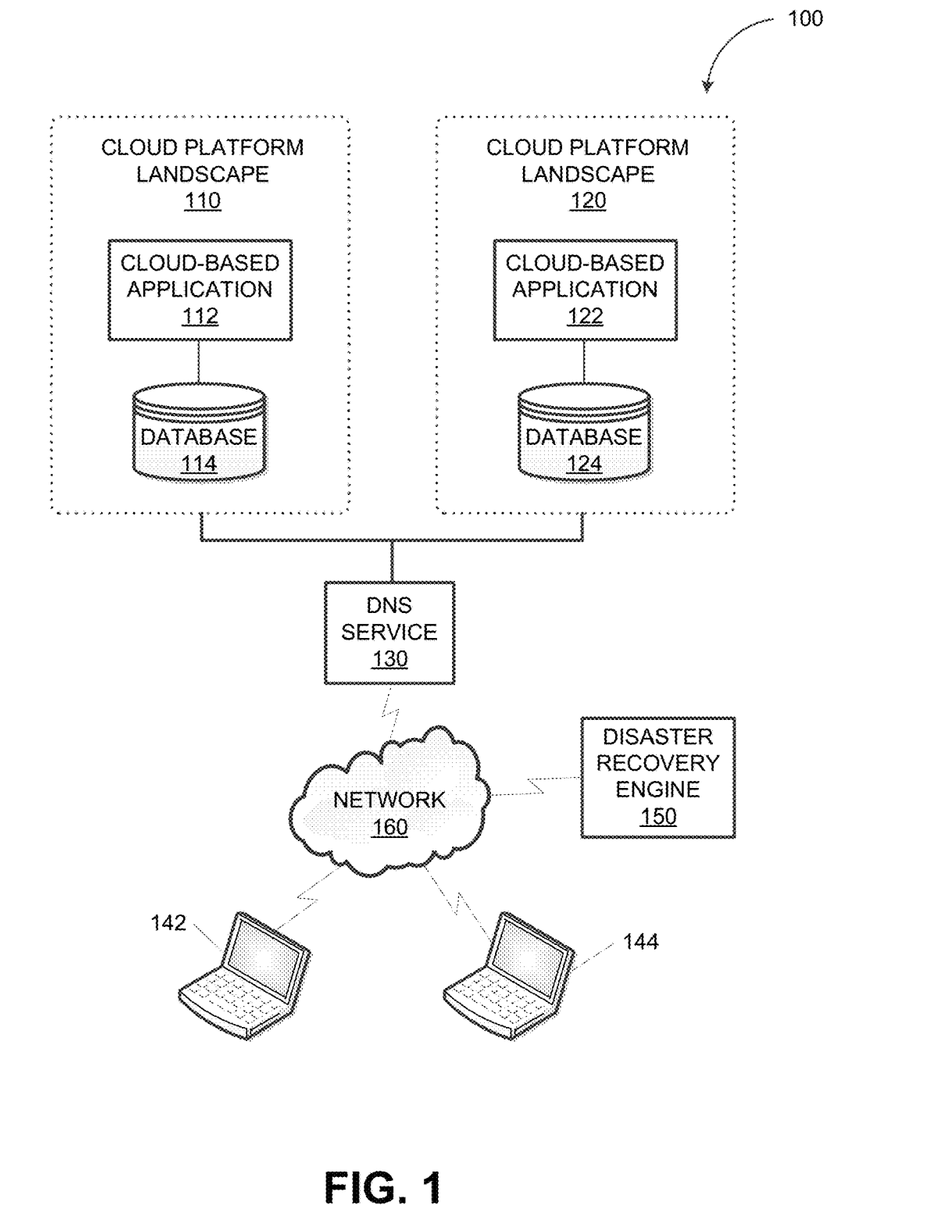
FIG. 1 depicts a network diagram illustrating a network environment consistent with implementations of the current subject matter.

FIG. 1 depicts a block diagram illustrating a network environment 100 consistent with implementations of the current subject matter. Referring to FIG. 1, the network environment 100 can include a first cloud platform landscape 110 and a second cloud platform landscape 120.

In some implementations of the current subject matter, a disaster recovery engine 150 can be configured to enable disaster recovery measures for a cloud-based application. As shown in FIG. 1, a first instance of the cloud-based application 112 can be deployed at the first cloud platform landscape 110. In addition, data associated with the first instance of the cloud-based application 112 can be stored in a first database 114 at the first cloud platform landscape 110. The data associated with the first instance of the cloud-based application 112 can include, for example, configurations, subscriptions, tenants, destinations (e.g., connectivity configurations to other applications), roles, permissions, assignments, and members.

To enable disaster recovery measures for the cloud-based application, the disaster recovery engine 150 can generate and deploy a fully operational copy of the cloud-based application at another cloud platform landscape. For example, as shown in FIG. 1, the disaster recovery engine 150 can generate and deploy a second instance of the cloud-based application 122 at the second cloud platform landscape 120. Alternately and/or additionally, the second instance of the cloud-based application 122 can be deployed separately (e.g., by a third-party) and the disaster recovery engine 150 can be configured to determine when the second instance of the cloud-based application 122 is deployed at the second cloud platform landscape 120.

In some implementations of the current subject matter, upon deployment of the second instance of the cloud-based application 122 at the second cloud platform landscape 120, the disaster recovery engine 150 can replicate, at a second database 124 at the second cloud platform landscape 120, data from the first database 114. In doing so, the second instance of the cloud-based application 122 at the second cloud platform landscape 120 can serve a fully operational copy of the first instance of the cloud-based application 112. It should be appreciated that the same or similar configurations can be applied to the first instance of the cloud-based application 112 and the second instance of the cloud-based application 122. Configurations for the cloud-based application can include, for example, a custom domain for the cloud-based application, permissions (e.g., administrators, developers), subscriptions (e.g., to other applications and/or accounts), and destinations (e.g., connectivity to other applications). The second instance of the cloud-based application 122 can be configured by the disaster recovery engine 150 and/or a third party.

In some implementations of the current subject matter, the network environment 100 can further include a DNS service 130 (e.g., a Global Traffic Manager (GTM), as provided by F5 Networks of Seattle, Wash.). The DNS service 130 can be configured to provide mappings between the custom domain of a cloud-based application to a primary URL of the first instance of the cloud-based application 112 and a secondary URL of the second instance of the cloud-based application 122. For example, a browser at the first client device 142 and/or the second client device 144 can resolve one or more HTTP requests for the custom domain of the cloud-based application by requesting the DNS service 130 to provide a mapping for the custom domain of the cloud-based application.

The DNS service 130 can be configured to include the custom domain for the cloud-based application as well as both the primary URL for the first instance of the cloud-based application 112 and the secondary URL for the second instance of the cloud-based application 122. According to some implementations of the current subject matter, the DNS service 130 can be configured to respond to the browser's request by providing a mapping from the custom domain of the cloud-based application to the primary URL of the first instance of the cloud-based application 112, thereby causing traffic to be routed to the first instance of the cloud-based application 112 at the first cloud platform landscape 110. Alternately and/or additionally, in the event the first instance of the cloud-based application 112 is unavailable (e.g., due to a failure at the first cloud platform landscape 110), the DNS service 130 can respond to the browser's request by providing a mapping from the custom domain of the cloud-based application to the secondary URL of the second instance of the cloud-based application 122. In doing so, traffic may be rerouted to the second instance of the cloud-based application 122 at the second cloud platform landscape 120 instead of to the first instance of the cloud-based application 112 at the first cloud platform landscape 110.

In some implementations of the current subject matter, the disaster recovery engine 150 can be configured to test the disaster recovery measures implemented for the cloud-based application. For example, the disaster recovery engine 150 can perform one or more tests to determine whether the second instance of the cloud-based application 122 is fully operational and/or that data from the first database 114 is fully replicated at the second database 124. The disaster recovery engine 150 can perform these tests subsequent to deploying the second instance of the cloud-based application 122 and/or replicating the first database 114 at the second database 124. Alternately and/or additionally, the disaster recovery engine 150 can test the disaster recovery measures by simulating a failure at the first cloud platform landscape 110 that requires a partial and/or full traffic switch from the first cloud platform landscape 110 to the second cloud platform landscape 120. The disaster recovery engine 150 can simulate a failure in order to determine whether the disaster recovery measures are compliant with respect to one or more metrics including, for example, RPO and RTO.

During a partial traffic switch, only requests originating from certain IP addresses are routed to the secondary URL of the second instance of the cloud-based application 122. For instance, during a partial traffic switch, the disaster recovery engine 150 can configure the DNS service 130 to respond to HTTP requests for the custom domain of the cloud-based application by providing a mapping from the custom domain of the cloud-based application to the secondary URL of the second instance of the cloud-based application 122, when these HTTP request originate from the first client device 142. Meanwhile, the DNS service 130 can respond to HTTP requests from the second client device 144 by providing a mapping from the custom domain of the cloud-based application to the primary URL of the first instance of the cloud-based application 112. By contrast, during a full traffic switch, the disaster recovery engine 150 can configure the DNS service 130 to respond to all requests (e.g., HTTP requests) for the custom domain of the cloud-based application by providing a mapping from the custom domain of the cloud-based application to the secondary URL of the second instance of the cloud-based application 122.

Referring again to FIG. 1, in some implementations of the current subject matter, the disaster recovery engine 150 can communicate with the first cloud platform landscape 110, the second cloud platform landscape 120, and/or the DNS service 130 via a wired and/or wireless network 160. The network 160 can include one or more of a wide area network (WAN), local area network (LAN), and the Internet. Moreover, it should be appreciated that the functionalities of the disaster recovery engine 150 can be accessed as a remote (e.g., cloud or the like) service via the network 160. Alternately and/or additionally, the disaster recovery engine 150 can be deployed locally, for example, as computer software and/or dedicated circuitry (e.g., application specific integrated circuits (ASICs)).

Figure 2:
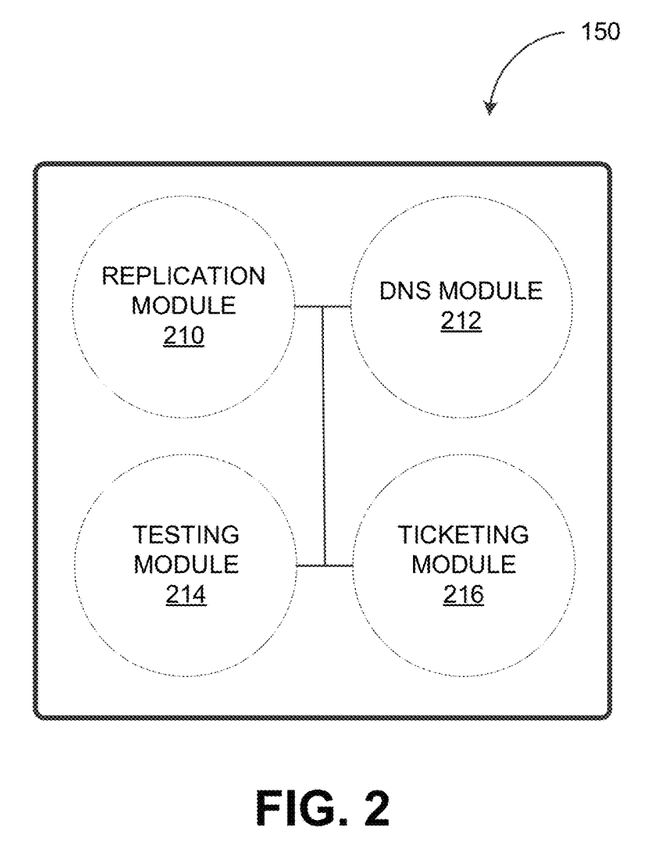
FIG. 2 depicts a block diagram illustrating a disaster recovery engine consistent with implementations of the current subject matter.

FIG. 2 depicts a block diagram illustrating the disaster recovery engine 150 consistent with implementations of the current subject matter. Referring to FIGS. 1-2, the disaster recovery engine 150 can include a replication module 210, a DNS module 212, a testing module 214, and a ticketing module 216. It should be appreciated that the disaster recovery engine 150 can include additional and/or different modules without departing from the scope of the present disclosure.

In some implementations of the current subject matter, the replication module 210 can be configured to generate and/or deploy a fully operational copy of a cloud-based application. For example, the replication module 210 can deploy, at the second cloud platform landscape 120, the second instance of the cloud-based application 122, which replicates the first instance of the cloud-based application 112 at the first cloud platform landscape 110. In addition, the replication module 210 can also replicate the data associated with the first instance of the cloud-based application 112. For instance, the replication module 210 can replicate, at the second database 124, data from the first database 114.

According to some implementations of the current subject matter, the second instance of the cloud-based application 122 can be deployed by a third party. As such, the replication module 210 can determine when the second instance of the cloud-based application 122 is deployed at the second cloud platform landscape 120. Upon determining that the second instance of the cloud-based application 122 is deployed at the second cloud platform landscape 120, the replication module 210 can replicate the data from the first database 114 to the second database 124.

In some implementations of the current subject matter, the replication module 210 can be configured to enable the replication of data associated with the first instance of the cloud-based application 112 by requesting a transfer of quotas from the first cloud platform landscape 110 to the second cloud platform landscape 120. These quotes can include, for example, an allocation of resources amongst different instances of applications, databases, and custom domains. The replication module 210 can be further configured to install the second database 124 at the second cloud platform landscape 120 and configure the first database 114 for replication (e.g., at the second database 124).

In some implementations of the current subject matter, the DNS module 212 can be configured cause a change in the routing of traffic from the first instance of the cloud-based application 112 to the second instance of the cloud-based application 122. For example, the DNS module 212 can configure the DNS service 130 to include a custom domain for a cloud-based application, a primary URL (e.g., for the first instance of the cloud-based application 112), and a secondary URL (e.g., for the second instance of the cloud-based application 122). As such, requests (e.g., HTTP requests) for the custom domain associated with the cloud-based application can be mapped (e.g., by the DNS service 130) to either the primary URL of the first instance of the cloud-based application 112 or the secondary URL of the second instance of the cloud-based application 122. According to some implementations of the current subject matter, the DNS module 212 can respond to a failure at the first cloud platform landscape 110 by configuring the DNS service 130 to change the mapping for the custom domain of the cloud-based application from being mapped to the primary URL of the first instance of the cloud-based application 112 to being mapped to the secondary URL of the second instance of the cloud-based application 122, thereby causing requests (e.g., HTTP requests) for the cloud-based application to be redirected from the first instance of the cloud-based application 112 to the second instance of the cloud-based application 122.

In some implementations of the current subject matter, the testing module 214 can be configured to test the disaster recovery measures implemented for a cloud-based application. For instance, the testing module 214 can determine whether the second instance of the cloud-based application 122 is fully operational and/or that data from the first database 114 is fully replicated at the second database 124. Alternately and/or additionally, the testing module 214 can be configured to simulate a failure at the first cloud platform landscape 110, thereby triggering a partial and/or full traffic switch from the first cloud platform landscape 110 to the second cloud platform landscape 120. During a partial or full traffic switch, the testing module 214 can configure the DNS service 130 to cause some or all of the requests (e.g., HTTP requests) for the cloud-based application to be routed to the secondary URL of the second instance of the cloud-based application 122 instead of to the primary URL of the first instance of the cloud-based application 112. In doing so, the testing module 214 can determine the compliance of the disaster recovery measures with respect to one or more metrics (e.g., RPO, RTO). According to some implementations of the current subject matter, the enablement of disaster recovery measures is complete when the testing module 214 successfully completes the testing of the disaster recovery measures and determines that the disaster recovery measures are compliant with respect to one or more metrics (e.g., RTO and/or RPO are less than a threshold value).

In some implementations of the current subject matter, the disaster recovery module 150 can coordinate the enablement of disaster recovery measures through an exchange of one or more tickets. As such, the ticketing module 216 can be configured to receive and/or generate one or more tickets. For instance, the ticketing module 216 can receive one or more tickets (e.g., from the first client device 142 and/or the second client device 144) requesting the enablement of disaster recovery measures for a cloud-based application deployed at a primary cloud platform landscape (e.g., the first instance of cloud-based application 112 hosted in the first cloud platform landscape 110). The ticketing module 216 can also be configured to generate tickets requesting the installation of the second database 124 and/or the configuration of the first database 114 for replication (e.g., at the second database 124). According to some implementations of the current subject matter, the ticketing module 216 can generate one or more tickets (e.g., PRODPULL tickets) requesting the installation of the second database 124 and/or the configuration of the first database 114 such that data associated with the first instance of the cloud-based application 112 can be replicated at the second database 124. The ticketing module 216 can further receive one or more tickets indicating when the installation of the second database 124 and/or the configuration of the first database 114 are completed and/or resolved. It should be appreciated that in some implementations of the current subject matter, the same ticket that was used to request the installation of the second database 124 and/or the configuration of the first database 114 can be returned to the ticketing module 216 to provide an indication of the installation of the second database 124 and/or the configuration of the first database 114 are completed and/or resolved.

Figure 3:
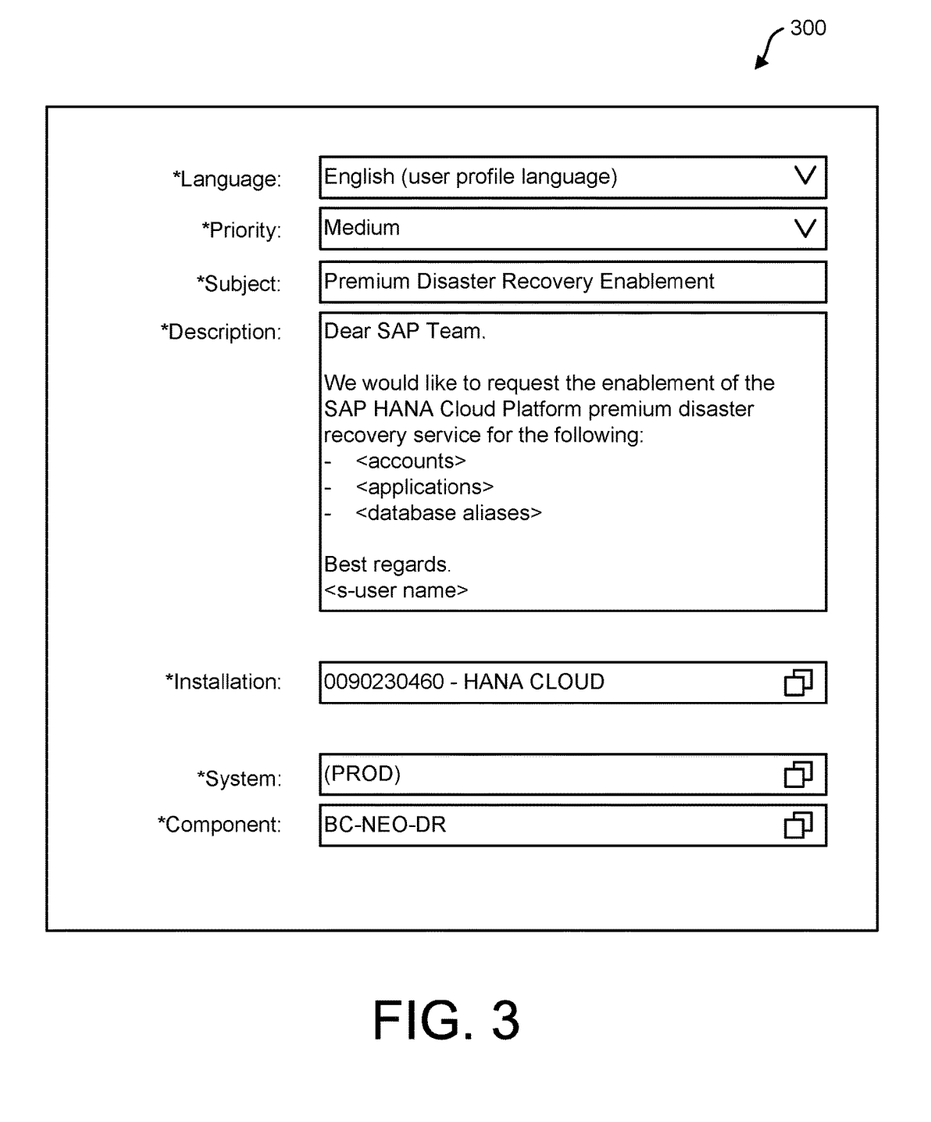
FIG. 3 depicts a disaster recovery enablement ticket consistent with implementations of the current subject matter.

FIG. 3 depicts a disaster recovery enablement ticket 300 consistent with some implementations of the current subject matter. Referring to FIG. 1-3, the first client device 142 or the second client device 144 may submit the disaster recovery enablement ticket 300 to the disaster recovery engine 150 (e.g., the ticketing module 216). The disaster recovery engine 150 can respond to the disaster recovery enablement ticket 300 by enabling disaster recovery measures for a cloud-based application (e.g., as indicated by the disaster recovery enablement ticket 300).

Figure 4:
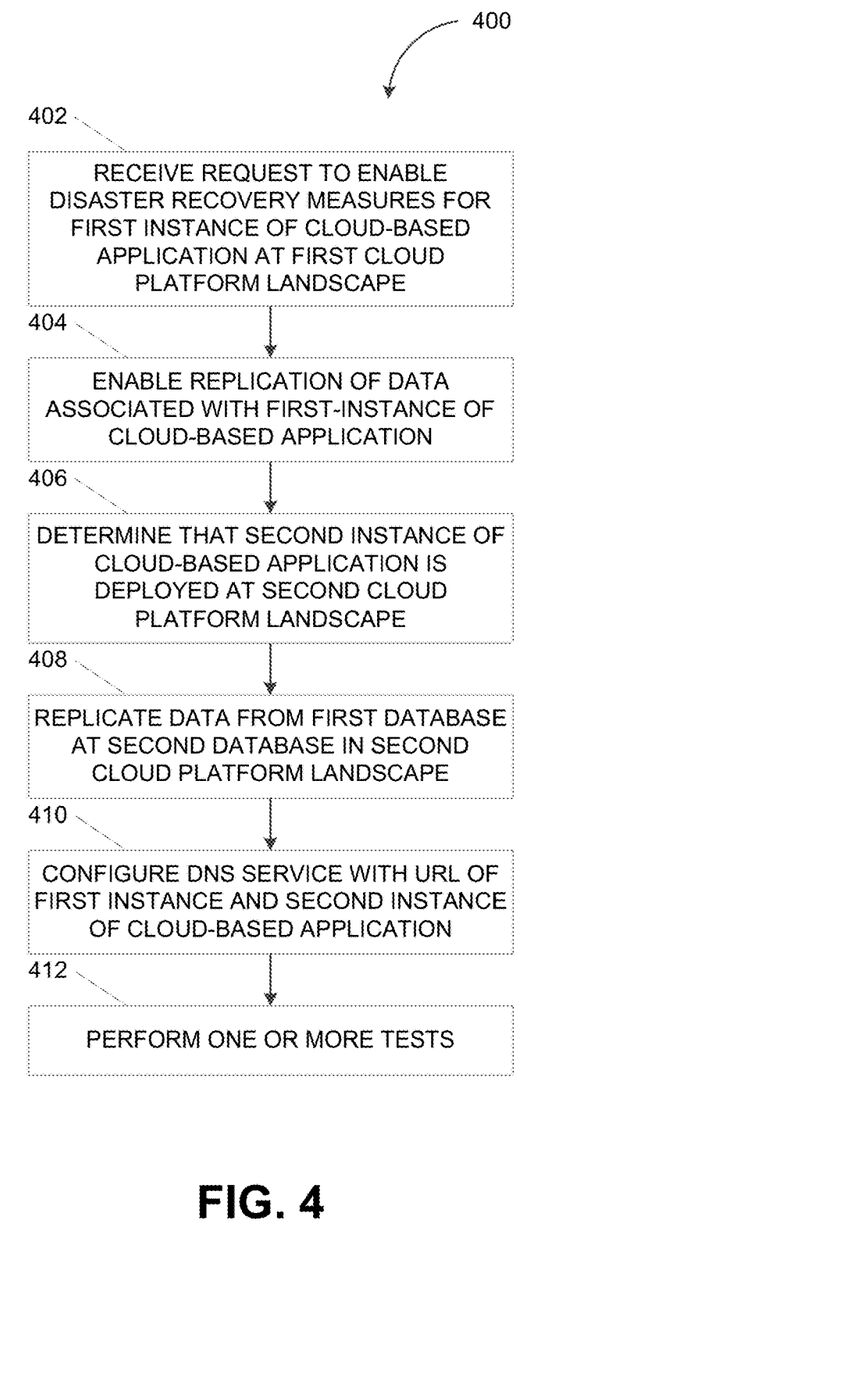
FIG. 4 depicts a flowchart illustrating a process for enabling disaster recovery consistent with implementations of the current subject matter.

FIG. 4 depicts a flowchart illustrating a process 400 for enabling disaster recovery consistent with implementations of the current subject matter. Referring to FIGS. 1-4, the process 400 can be performed by the disaster recovery engine 150.

The disaster recovery engine 150 can receive a request to enable disaster recovery measures for a first instance of a cloud-based application at a first cloud platform landscape (402). For instance, the disaster recovery engine 150 can receive the disaster recovery enablement ticket 300 indicating, for example, that disaster recovery measures should be enabled for the first instance of the cloud-based application 112, which is hosted in the first cloud platform landscape 110.

The disaster recovery engine 150 can enable replication of data associated with the first instance of the cloud-based application (404). For example, the disaster recovery engine 150 (e.g., the replication module 210) can respond to the disaster recovery enablement ticket 300 by enabling the replication of data associated with the first instance of the cloud-based application 112. The disaster recovery engine 150 can enable the replication of data associated with the first instance of the cloud-based application 112 by requesting a transfer of quotas from the first cloud platform landscape 110 to the second cloud platform landscape 120. These quotes can include, for example, an allocation of resources amongst different instances of applications, databases, and custom domains. Data associated with the first instance of the cloud-based application 112 can be stored in the first database 114 at the first cloud platform landscape 110. As such, the disaster recovery engine 150 can install the second database 124 at the second cloud platform landscape 120. Moreover, the disaster recovery engine 150 can further configure the first database 114 for replication. According to some implementations of the current subject matter, the disaster recovery engine 150 (e.g., the ticketing module 216) can install the second database 124 and configure the first database 114 for replication by generating one or more tickets (e.g., PRODPULL tickets) requesting the installation of the second database 124 and/or the configuration of the first database 114. The disaster recovery engine 150 can further determine when the tickets requesting the installation of the second database 124 and/or the configuration of the first database 114 are completed and/or resolved.

The disaster recovery engine 150 can determine that a second instance of the cloud-based application is deployed at a second cloud platform landscape (406). For instance, the second instance of the cloud-based application 122 can be deployed at the second cloud platform landscape 120 by the disaster recovery engine 150 (e.g., the replication module 210) and/or by a third party. As such, the disaster recovery engine 150 can determine when the second instance of the cloud-based application 122 has been deployed at the second cloud platform landscape 120. For example, when the second instance of the cloud-based application 122 is deployed by a third party, the disaster recovery engine 150 (e.g., the ticketing module 216) can receive a ticket indicating that the deployment and/or configuration of the second instance of the cloud-based application 122 is complete.

The disaster recover engine 150 can replicate, at the second database in the second cloud platform landscape, data from the first database in the first cloud platform landscape (408). For example, the disaster recovery engine 150 (e.g., the replication module 210) can replicate data from the first database 114 to the second database 124. Data from the first database 114 is replicated to the second database 124 such that the second instance of the cloud-based application 122 can be a fully operational copy of the first instance of the cloud-based application 112.

The disaster recovery engine 150 can configure a DNS service to include the respective URLs of the first instance of the cloud-based application and the second instance of the cloud-based application (410). For instance, the disaster recovery engine 150 (e.g., the DNS module 212) can configure the DNS service 130 (e.g., a DTM) to include the custom domain for the cloud-based application as well as a primary URL for the first instance of the cloud-based application 112 and a secondary URL for the second instance of the cloud-based application 122. Configuring the DNS service 130 with both the primary URL for the first instance of the cloud-based application 112 and the second instance of the cloud-based application 122 enables the DNS service 130 to provide different mappings for the custom domain of the cloud-based application. For example, the DNS service 130 can map the custom domain of the cloud-based application to either the primary URL or the secondary URL. When the first instance of the cloud-based application 112 is unavailable (e.g., due to a failure at the first cloud platform landscape 110), the DNS service 130 can be configured to map the custom domain of the cloud-based application to the secondary URL instead of to the primary URL, thereby causing a rerouting of traffic from the first instance of the cloud-based application 112 to the second instance of the cloud-based application 122.

The disaster recovery engine 150 can perform one or more tests (412). For example, the disaster recovery engine 150 (e.g., the testing module 214) can test whether the second instance of the cloud-based application 122 at the second cloud platform landscape 120 is fully replicated and operational. Alternately and/or additionally, the disaster recovery engine 150 can simulate a failure at the first cloud platform landscape 110 that requires a partial and/or full switch of the traffic from the first cloud platform landscape 110 the secondary cloud platform landscape 120. A partial and/or full traffic switch can be performed to determine compliance with respect to one or more metrics including, for example, RPO and RTO. According to some implementations of the current subject matter, the enablement of disaster recovery measures is complete when the disaster recovery engine 150 completes its testing of the disaster recovery measures. For example, the enablement of disaster recovery measures is complete when the disaster recovery engine 150 determines that the second instance of the cloud-based application 122 is fully replicated and operational. Alternately and/or additionally, the enablement of disaster recovery measures is complete when the RPO and/or RTO associated with the disaster recovery measures are below a threshold value.

Figure 5:
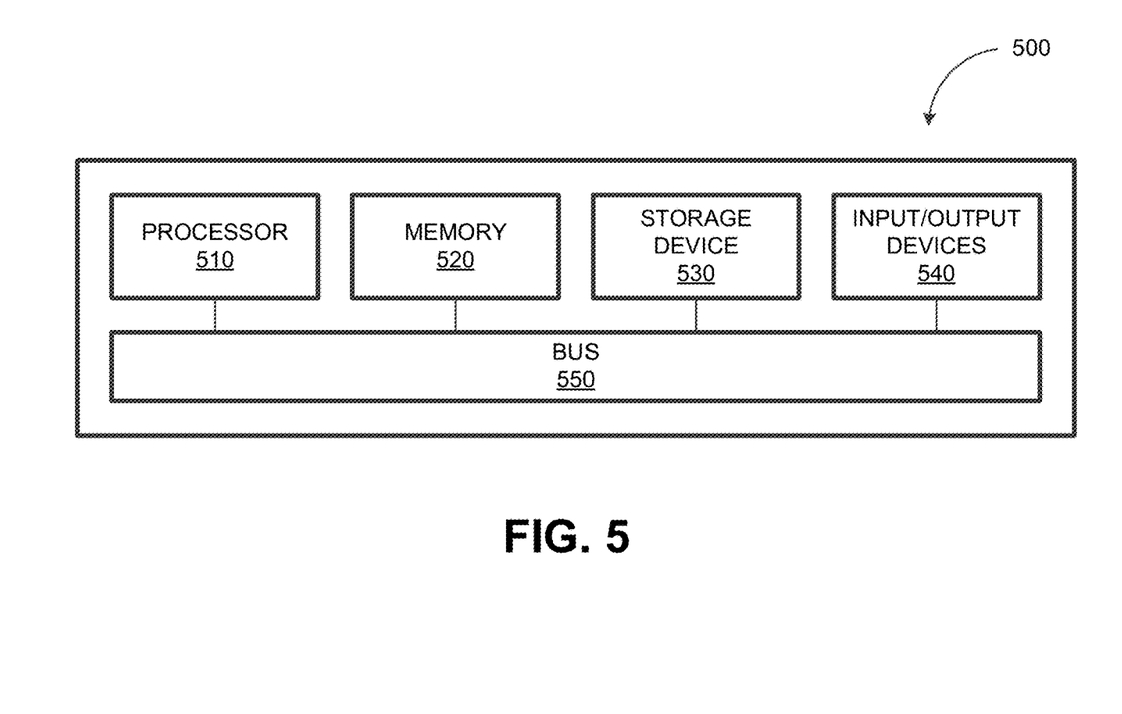
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1 and 5, the computing system 500 can be used to implement the disaster recovery engine 150 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the disaster recovery engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer implemented method for enabling disaster recovery for a first instance of a cloud-based application deployed at a first cloud platform landscape, the method comprising:
   determining that a second instance of the cloud-based application is deployed at a second cloud platform landscape;
   replicating, at a second database at the second cloud platform landscape, at least a portion of data from a first database at the first cloud platform landscape, the data from the first database being associated with the first instance of the cloud-based application;
   configuring a domain name system (DNS) service to include a custom domain of the cloud-based application, a primary universal resource locator (URL) for the first instance of the cloud-based application, and a secondary URL for the second instance of the cloud-based application, the custom domain of the cloud-based application being mapped by the DNS service to the secondary URL instead of to the primary URL in the event of a failure at the first cloud platform landscape; and performing one or more tests to determine a compliance of the enabled disaster recovery with respect to a recovery point objective (RPO) and/or a recovery time objective (RTO), the performing of the one or more tests comprising:
- simulating a failure at the first cloud platform landscape; and
- performing a traffic switch by at least configuring the DNS service to map the custom domain of the cloud-based application to the secondary URL of the second instance of the cloud-based application instead of to the primary URL of the first instance of the cloud-based application, the mapping of the custom domain of the cloud-based application to the secondary URL causing requests for the custom domain of the cloud-based application to be routed to the second instance of the cloud-based application instead of to the first instance of the cloud-based application.

2. The computer-implemented method of claim 1, wherein the deploying of the second instance of the cloud-based application and the replicating of the data from the first database at the second database generate a fully operational copy of the cloud-based application at the second cloud platform landscape.

3. The computer-implemented method of claim 1, wherein the traffic switch comprises a partial traffic switch during which requests for the custom domain of the cloud-based application originating from one or more specific internet protocol (IP) addresses are routed to the second instance of the cloud-based application instead of to the first instance of the cloud-based application.

4. The computer-implemented method of claim 1, wherein the traffic switch comprises a full traffic switch during which all requests for the custom domain of the cloud-based application are routed to the second instance of the cloud-based application instead of to the first instance of the cloud-based application.

5. The computer-implemented method of claim 1, further comprising:
- applying, to the second instance of the cloud-based application, one or more configurations that are the same as at least some of a plurality of configurations applied at the first instance of the cloud-based application.

6. The computer-implemented method of claim 5, wherein the one or more configurations include the custom domain for the cloud-based application, permissions, subscriptions, and/or destinations.

7. The computer-implemented method of claim 1, further comprising:
- receiving, from a client, a first ticket requesting enablement of disaster recovery for the first instance of the cloud-based application deployed at the first cloud platform landscape; and
- responding to the receiving of the first ticket by at least generating a second ticket requesting an installation of the second database and/or a configuration of the first database for replication.

8. The computer-implemented method of claim 7, wherein the replicating of at least the portion of the data from the first database at the first cloud platform landscape includes requesting a transfer of quotas from the first cloud platform landscape to the second cloud platform landscape, and wherein the quotas include an allocation of resources amongst the first instance of the cloud-based application, the second instance of the cloud-based application, the first database, the second database, and the custom domain of the cloud-based application.

9. A system for enabling disaster recovery for a first instance of a cloud-based application deployed at a first cloud platform landscape, the system comprising:
- at least one processor; and
- at least one memory including program code which when executed by the at least one processor provides operations comprising:
  - determining that a second instance of the cloud-based application is deployed at a second cloud platform landscape;
  - replicating, at a second database at the second cloud platform landscape, at least a portion of data from a first database at the first cloud platform landscape, the data from the first database being associated with the first instance of the cloud-based application;
  - configuring a domain name system (DNS) service to include a custom domain of the cloud-based application, a primary universal resource locator (URL) for the first instance of the cloud-based application, and a secondary URL for the second instance of the cloud-based application, the custom domain of the cloud-based application being mapped by the DNS service to the secondary URL instead of to the primary URL in the event of a failure at the first cloud platform landscape; and
  - performing one or more tests to determine a compliance of the enabled disaster recovery with respect to a recovery point objective (RPO) and/or a recovery time objective (RTO), the performing of the one or more tests comprising:
    - simulating a failure at the first cloud platform landscape; and
    - performing a traffic switch by at least configuring the DNS service to map the custom domain of the cloud-based application to the secondary URL of the second instance of the cloud-based application instead of to the primary URL of the first instance of the cloud-based application, the mapping of the custom domain of the cloud-based application to the secondary URL causing requests for the custom domain of the cloud-based application to be routed to the second instance of the cloud-based application instead of to the first instance of the cloud-based application.

10. The system of claim 9, wherein the deploying of the second instance of the cloud-based application and the replicating of the data from the first database at the second database generate a fully operational copy of the cloud-based application at the second cloud platform landscape.

11. The system of claim 9, wherein the traffic switch comprises a partial traffic switch during which requests for the custom domain of the cloud-based application originating from one or more specific internet protocol (IP) addresses are routed to the second instance of the cloud-based application instead of to the first instance of the cloud-based application.

12. The system of claim 9, wherein the traffic switch comprises a full traffic switch during which all requests for the custom domain of the cloud-based application are routed to the second instance of the cloud-based application instead of to the first instance of the cloud-based application.

13. The system of claim 9, further comprising:
applying, to the second instance of the cloud-based application, one or more configurations that are the same as at least some of a plurality of configurations applied at the first instance of the cloud-based application, the one or more configurations including the custom domain for the cloud-based application, permissions, subscriptions, and/or destinations.

14. The system of claim 9, further comprising:
receiving, from a client, a first ticket requesting enablement of disaster recovery for the first instance of the cloud-based application deployed at the first cloud platform landscape; and
responding to the receiving of the first ticket by at least generating a second ticket requesting an installation of the second database and/or a configuration of the first database for replication.

15. The system of claim 9, wherein the replicating of at least the portion of the data from the first database at the first cloud platform landscape includes requesting a transfer of quotas from the first cloud platform landscape to the second cloud platform landscape, and wherein the quotas include an allocation of resources amongst the first instance of the cloud-based application, the second instance of the cloud-based application, the first database, the second database, and the custom domain of the cloud-based application.

16. A non-transitory computer-readable storage medium including program code which when executed by at least one processor causes operations comprising:
determining that a second instance of the cloud-based application is deployed at a second cloud platform landscape;
replicating, at a second database at the second cloud platform landscape, at least a portion of data from a first database at the first cloud platform landscape, the data from the first database being associated with the first instance of the cloud-based application;
configuring a domain name system (DNS) service to include a custom domain of the cloud-based application, a primary universal resource locator (URL) for the first instance of the cloud-based application, and a secondary URL for the second instance of the cloud-based application, the custom domain of the cloud-based application being mapped by the DNS service to the secondary URL instead of to the primary URL in the event of a failure at the first cloud platform landscape; and
performing one or more tests to determine a compliance of the enabled disaster recovery with respect to a recovery point objective (RPO) and/or a recovery time objective (RTO), the performing of the one or more tests comprising:
simulating a failure at the first cloud platform landscape; and
performing a traffic switch by at least configuring the DNS service to map the custom domain of the cloud-based application to the secondary URL of the second instance of the cloud-based application instead of to the primary URL of the first instance of the cloud-based application, the mapping of the custom domain of the cloud-based application to the secondary URL causing requests for the custom domain of the cloud-based application to be routed to the second instance of the cloud-based application instead of to the first instance of the cloud-based application.

17. The computer-readable medium of claim 16, wherein the traffic switch comprises a partial traffic switch during which requests for the custom domain of the cloud-based application originating from one or more specific internet protocol (IP) addresses are routed to the second instance of the cloud-based application instead of to the first instance of the cloud-based application.

18. The computer-readable medium of claim 16, wherein the traffic switch comprises a full traffic switch during which all requests for the custom domain of the cloud-based application are routed to the second instance of the cloud-based application instead of to the first instance of the cloud-based application.

19. The computer-readable medium of claim 16, further comprising:
receiving, from a client, a first ticket requesting enablement of disaster recovery for the first instance of the cloud-based application deployed at the first cloud platform landscape; and
responding to the receiving of the first ticket by at least generating a second ticket requesting an installation of the second database and/or a configuration of the first database for replication.

20. The computer-readable medium of claim 16, wherein the replicating of at least the portion of the data from the first database at the first cloud platform landscape includes requesting a transfer of quotas from the first cloud platform landscape to the second cloud platform landscape, and wherein the quotas include an allocation of resources amongst the first instance of the cloud-based application, the second instance of the cloud-based application, the first database, the second database, and the custom domain of the cloud-based application.

* * * * *